United States Patent
Yu et al.

(10) Patent No.: US 7,603,092 B2
(45) Date of Patent: Oct. 13, 2009

(54) ESTIMATION OF CINR AND RSSI IN A WIRELESS COMMUNICATION SYSTEM

(75) Inventors: Xiaoyong Yu, Grayslake, IL (US); Alan P. Rottinghaus, Barrington, IL (US); Jian J. Wu, Reading (GB)

(73) Assignee: Motorola, Inc., Schaumburg, IL (US)

( * ) Notice: Subject to any disclaimer, the term of this patent is extended or adjusted under 35 U.S.C. 154(b) by 370 days.

(21) Appl. No.: 11/455,373

(22) Filed: Jun. 19, 2006

(65) Prior Publication Data

US 2007/0293176 A1    Dec. 20, 2007

(51) Int. Cl.
*H04B 17/00* (2006.01)
(52) U.S. Cl. ............... 455/226.1; 455/226.2; 455/226.3; 455/67.11; 455/67.13
(58) Field of Classification Search ............... 455/226.1, 455/226.2, 226.3, 67.11, 67.13, 114.2, 115.1, 455/115.3, 115.4, 134–136, 226.4, 277.2, 455/278.1, 281, 295–296, 306–307; 375/343, 375/229–233, 350, 346–348, 355, 148–150
See application file for complete search history.

(56) References Cited

U.S. PATENT DOCUMENTS

| | | | | |
|---|---|---|---|---|
| 6,862,326 B1 * | 3/2005 | Eran et al. | .................. | 375/343 |
| 7,212,593 B2 * | 5/2007 | He | ............... | 375/346 |
| 7,218,665 B2 * | 5/2007 | McElwain | .................. | 375/143 |
| 7,230,975 B2 * | 6/2007 | Subrahmanya et al. | ...... | 375/148 |
| 7,349,489 B2 * | 3/2008 | Rouphael | .................... | 375/296 |
| 2006/0165025 A1 * | 7/2006 | Singh et al. | ................. | 370/315 |
| 2006/0203943 A1 * | 9/2006 | Scheim et al. | .............. | 375/341 |
| 2007/0153737 A1 * | 7/2007 | Singh et al. | ................. | 370/331 |
| 2008/0056343 A1 * | 3/2008 | Rajagopal et al. | ........... | 375/232 |

* cited by examiner

*Primary Examiner*—Pablo N Tran

(57) ABSTRACT

A method for selecting at least one operating parameter of a communication system (100). The method can include determining a receive signal strength indicator (RSSI) for a communication signal (330). An intermediate value (D) for the communication signal can be determined based on, at least in part, a received value ($r_i$) of at least one known datum, a predetermined value ($p_i$) of the known datum and a channel estimate ($\hat{h}_i$). Further, a carrier to interference and noise ratio (CINR) can be estimated based on, at least in part, the RSSI and the intermediate value. The operating parameter can be selected based on, at least in part, the estimated CINR.

9 Claims, 2 Drawing Sheets

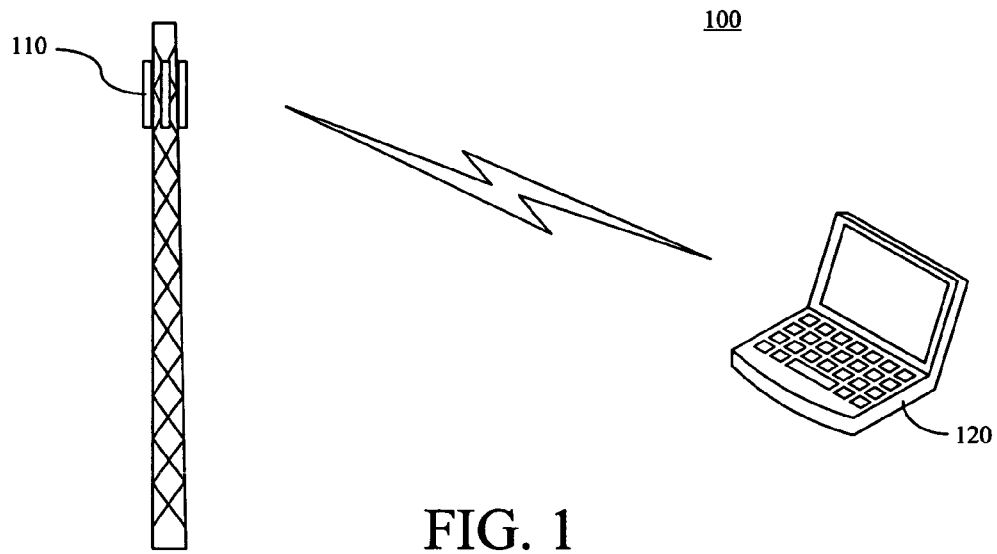
FIG. 1
(Prior Art)
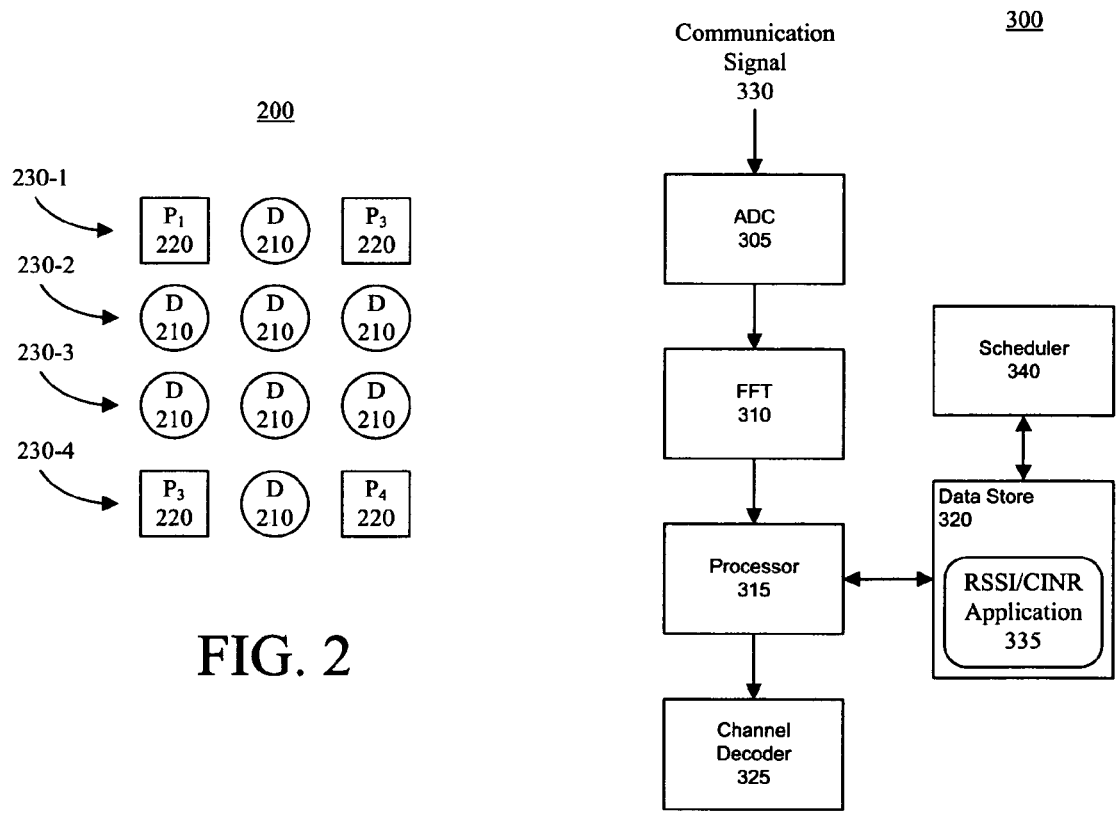
FIG. 2
FIG. 3

ESTIMATION OF CINR AND RSSI IN A WIRELESS COMMUNICATION SYSTEM

BACKGROUND OF THE INVENTION

1. Field of the Invention

The present invention generally relates to wireless communications and, more particularly, to estimating noise and signal strength of RF signals.

2. Background of the Invention

FIG. 1 depicts a communication system 100 that implements wireless communications in accordance with the Institute of Electrical and Electronics Engineers (IEEE) 802.16 broadband wireless access standards (WiMax) for metropolitan area networks (MANs). WiMax specifies the use of orthogonal frequency division multiplexing (OFDM) as a modulation scheme to communicate data between a signal source, such as a basestation 110, and a subscriber station, such as a mobile station 120. OFDM is able to communicate a large amount of data over a limited bandwidth by allocating the data among multiple smaller sub-signals, and then simultaneously transmitting the sub-signals using different subcarriers.

Both carrier to interference and noise ratio (CINR) and receive signal strength indicator (RSSI) are important channel quality measurements for WiMax. In particular, IEEE 802.16e requires that each basestation 110 use CINR and RSSI measurements for modulation code scheme selection and tone/subchannel assignment. Although 802.16e does not mandate a particular method to be used for measuring CINR and RSSI, section 8.4.11 of the specification does recommend that RSSI and CINR be determined using the following equations:

$$RSSI = C \frac{1}{N} \sum_{n=0}^{N-1} |y_{k,n}|^2 \quad (1)$$

$$CINR = \frac{\sum_{n=0}^{N-1} |s_{k,n}|^2}{\sum_{n=0}^{N-1} |x_{k,n} - s_{k,n}|^2} \quad (2)$$

where $y_{k,n}$ is the $n^{th}$ sample of a time-domain signal k that is output after analog to digital conversion, C is a constant that depends on the precision, input resistance and clip level of the analog to digital converter and the analog gain from an antenna with which the signal is received, $x_{k,n}$ is a received sample n within the signal k, $s_{k,n}$ represents an associated detected or pilot signal sample with channel state weighting, and N is the number of samples used in the estimate.

In real world systems, measurements of RSSI and CINR can be equivalently performed after the signals have been processed using the Fast Fourier Transform (FFT). Applying the recommended method to a FFT processed signal, RSSI and CINR are determined by the following equations:

$$RSSI = C' \frac{1}{N} \sum_{n=0}^{N-1} |r_{k,n}| \quad (3)$$

$$CINR = \frac{\sum_{n=0}^{N-1} |p_{k,n} h_{k,n}|^2}{\sum_{n=0}^{N-1} |r_{k,n} - p_{k,n} h_{k,n}|^2} \quad (4)$$

where C' takes all path gain from analog to digital conversion and FFT into account (absent such gain, C'=C), $r_{k,n}$ is a received symbol on an $n^{th}$ subcarrier within the signal k after FFT, $p_{k,n}$ is a corresponding predetermined value of a pilot symbol, and $h_{k,n}$ is associated channel impulse response in the frequency domain.

In 802.16e, it is stated that the absolute accuracy of measurements shall be +/−4 dB for RSSI and +/−2 dB for CINR. Unfortunately, for real RF channels, the frequency domain coefficients of impulse response ($h_{k,n}$) are unknown. Thus, the recommended equation for determining CINR is inadequate to insure that the CINR is measured on an FFT processed signal with the prescribed accuracy.

SUMMARY OF THE INVENTION

The present invention relates to a method for selecting at least one operating parameter of a communication system. The method can include determining a receive signal strength indicator (RSSI) for a communication signal. An intermediate value for the communication signal can be determined based on, at least in part, a received value of at least one known datum, a predetermined value of the known datum and a channel estimate. Further, a carrier to interference and noise ratio (CINR) can be estimated based on, at least in part, the RSSI and the intermediate value. The operating parameter can be selected based on, at least in part, the estimated CINR.

In another arrangement, the method can include determining a receive signal strength indicator (RSSI) for a communication signal and selecting a data set comprising a plurality of known datum contained in the communication signal. The method also can include determining a least squares channel estimate (LSCE) for each known datum in the data set by dividing each known datum's received value by its predetermined value. Yule-Walker equations can be formed based on, at least in part, correlation coefficients determined for data set. The Yule-Walker equations can be solved to determine at least a variance of linear estimation error. An intermediate value can be determined for the communication signal based on, at least in part, a received value of at least one of the plurality of known datum, a predetermined value of the at least one known datum and a channel estimate. Further, a carrier to interference and noise ratio (CINR) can be estimated based on, at least in part, the RSSI, the variance the intermediate value. The operating parameter can be selected based on, at least in part, the estimated CINR.

Another embodiment of the present invention can include a machine readable storage being programmed to cause a machine to perform the various steps described herein.

BRIEF DESCRIPTION OF THE DRAWINGS

Preferred embodiments of the present invention will be described below in more detail with reference to the accompanying drawings, in which:

FIG. 1 depicts a communication system that implements wireless communications in accordance with the 802.16 broadband wireless access standards (WiMax);

FIG. 2 depicts an uplink partial usage subcarrier (PUSC) tile 200 of an orthogonal frequency division multiplexed (OFDM) signal which is useful for understanding the present invention;

FIG. 3 depicts signal processing components which are useful for understanding the present invention.

DETAILED DESCRIPTION

Figure 4:
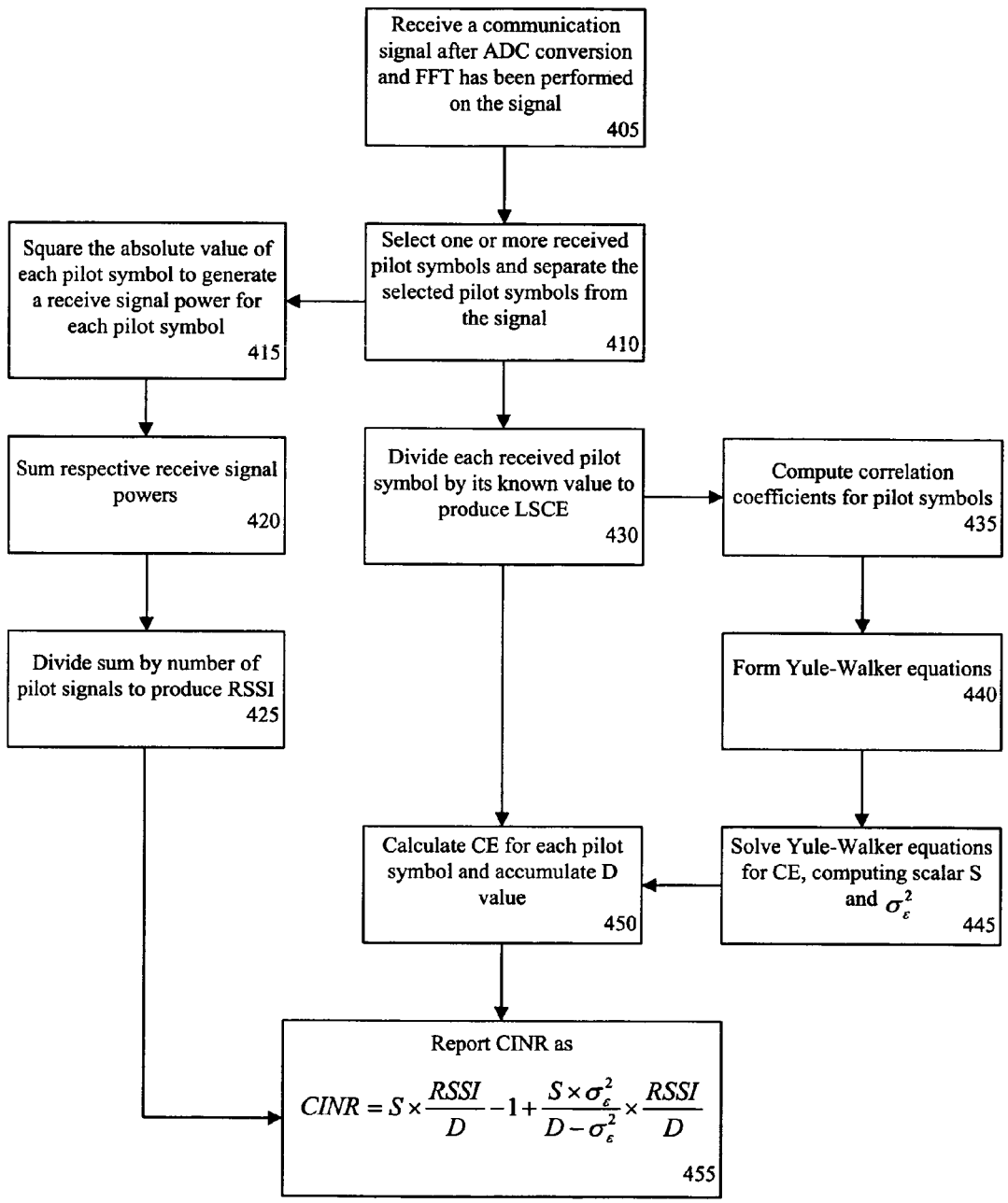
FIG. 4 is flowchart illustrating a method for estimating a carrier to interference and noise ratio (CINR) and a receive signal strength indicator (RSSI) for a communication signal in accordance with an embodiment of the present invention.

While the specification concludes with claims defining features of the invention that are regarded as novel, it is believed that the invention will be better understood from a consideration of the description in conjunction with the drawings. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure. Further, the terms and phrases used herein are not intended to be limiting but rather to provide an understandable description of the invention.

The present invention relates to a method for accurately estimating a carrier to interference and noise ratio (CINR) and a receive signal strength indicator (RSSI) for a communication signal. Advantageously, the present invention generates channel estimates from known data that are contained in the communication signal. The channel estimates then can be used to estimate the CINR and the RSSI in a manner that compensates for an otherwise unknown impulse response of the channel.

FIG. 2 depicts an uplink partial usage subcarrier (PUSC) tile 200 of an orthogonal frequency division multiplexed (OFDM) signal which is useful for understanding the present invention. The example PUSC tile 200 that is shown represents symbols recovered from a typical OFDM uplink signal, however, the invention is not limited in this regard. For instance, the present invention also can be used with a downlink signal. Moreover, the present invention also can be used with other types of communication signals, for example global system for mobile (GSM), code division multiple access (CDMA) and orthogonal frequency-division multiple access (OFDMA) in $3^{rd}$ Generation Partnership Project (3GPP) and 3GPP2 signals.

The PUSC tile 200 can include a plurality of symbols 210, 220. In one arrangement, the PUSC tile 200 can include a group 230 of symbols 210, 220 for each of a plurality of sub-signals. For instance, in the example that is shown, the PUSC tile 200 can include four subcarriers within three consecutive OFDM symbols. For instance, the PUSC tile 200 can include a data symbol 210 and two pilot symbols 220 on a first subcarrier 230-1, three data symbols 210 on a second subcarrier 230-2, three data symbols 210 on a third subcarrier 230-3, and a data symbol 210 and two pilot symbols 220 on a fourth subcarrier 2304.

Whereas the data symbols 210 represent source information being transmitted in a communication signal, the pilot symbols 220 typically do not. Instead, the pilot symbols 220 may contain pre-determined information such that the pilot symbols 220 are known to both the transmitter and receiver prior to transmission of the communication signal. Accordingly, the pilot symbols 220 can be processed by a receiver to maintain synchronization with a transmitter, perform channel estimation, determine frequency error, and implement other signal processing functions. In accordance with an embodiment of the present invention, the pilot symbols 220 also can be processed to generate correlation coefficients that can be used to estimate the CINR and the RSSI of the signal.

FIG. 3 depicts signal processing components 300 which are useful for understanding the present invention. The signal processing components 300 can be included in an RF receiver that receives communication signals. Such components 300 can be, for example, integrated into a transceiver of a basestation or a subscriber station.

The signal processing components 300 can include an analog to digital converter (ADC) 305, an FFT module 310, a processor 315, a data store 320 and a channel decoder 325. In operation, the ADC 305 can receive a communication signal 330, for instance an OFDM signal that was transmitted in accordance with the Electrical and Electronics Engineers (IEEE) 802.16 broadband wireless access standards (WiMax). The ADC 305 can convert the received communication signal into a digital signal and forward the digital signal to the FFT module 310. The FFT module 310 can perform a FFT on the digital signal and output complex signal values to the processor 315. The processor 315 can execute an RSSI/CINR application 335 retrieved from the data store 320 to generate estimates for the CINR and the RSSI of the communication signal 330.

The processor 315 can forward the CINR and RSSI estimates to a scheduler 340 for use in selecting at least one operating parameter for the communication system. For example, in a WiMax communication system, CINR and RSSI estimates determined in accordance with the processes describe herein can be used by a basestation and/or a subscriber station for modulation code scheme selection and tone/subchannel assignment. Still, the CINR and RSSI estimates may be used to select other operating parameters and the invention is not limited in this regard.

FIG. 4 is flowchart illustrating a method 400 for estimating a carrier to interference and noise ratio (CINR) and a receive signal strength indicator (RSSI) for a communication signal in accordance with an embodiment of the present invention. Such method can be implemented by execution of the RSSI/CINR application. The method 400 is presented using pilot symbols recovered from a known pilot signal using the FFT. Notwithstanding, other known data can be used in lieu of, or in addition to, the pilot symbols. Examples of such other data include, but are not limited to, a known preamble, a known mid-amble and data symbols recovered with decoder feedback. Still, other known data can be used and the invention is not limited in this regard.

Beginning at step 405, a communication signal can be received after analog to digital conversion and FFT has been performed on the signal. At this point, data and pilot symbols recovered from the communication signal may have complex values. At step 410 one or more of the pilot symbols can be selected, and the selected pilot symbols can be separated from the data symbols. Referring to step 415, the absolute value of each of the selected pilot symbols can be squared to generate a receive power for such pilot symbols. This can be accomplished, for instance, by multiplying the value of each of the selected pilot symbols by its conjugate value. At step 420, the respective receive signal powers can be summed. Continuing to step 425, the sum can be divided by the number of selected pilot symbols to generate an RSSI for a tile within the communication signal. Steps 415-425 may be represented by the following equation:

$$RSSI_t = \frac{1}{N_p} \sum_{i=1}^{N_p} |r_i|^2 \qquad (5)$$

Where $RSSI_t$ is the individual RSSI for the tile t, $N_p$ is the number of pilot symbols per tile selected to generate the RSSI estimate and $r_i$ is a receive value of a respective pilot symbol i after FFT.

Referring to step 430, the receive value ($r_i$) of each selected pilot symbol can be divided by its predetermined value ($p_i$) to produce a least squares channel estimate (LSCE), as shown by the following equation:

$$LSCE_i = \frac{r_i}{p_i} \qquad (6)$$

Proceeding to step 435, correlation coefficients for the selected pilot symbols can be estimated. For instance, in WiMax PUSC mode, the channel correlation coefficients can be determined by the following equation:

$$R_{i,j}(t) = \frac{r_i p_i \times r_j^* p_j}{|r_i p_i| \times |r_j p_j|} \quad \text{for } i, j = 1 \text{ to } N_p \qquad (7)$$

where $R_{i,j}$ is the channel correlation coefficient for location i and location j in an OFDM time-frequency grid, $p_i$ is a pilot symbol at location i, $r_i$ is a received pilot symbol corresponding to $p_i$, $p_j$ is a pilot symbol at location j, $r_j$ is a received pilot symbol corresponding to $p_j$, and t denotes correlation within a tile. The OFTM time-frequency grid is known to the skilled artisan.

Assuming that T is the number of tiles available for estimating CINR and RISSI, the RSSI and correlation coefficients determined for a plurality of tiles can be averaged using equations (8) and (9) to improve CINR and RSSI estimation:

$$RSSI = \frac{1}{T} \sum_{t=1}^{T} RSSI_t \text{ and} \qquad (8)$$

$$R_{i,j} = \frac{1}{T} \sum_{t=1}^{T} R_{i,j}(t) \qquad (9)$$

In general, the channel correlation coefficient between locations i and j is defined as:

$$R_{i,j} = E(h_i h_j^*) \qquad (10)$$

where E(.) is mathematical expectation, and $h_i$ and $h_j$ are estimated channel responses at locations i and j respectively.

Proceeding to step 440, the following linear estimation model can be used to form Yule-Walker equations:

$$\tilde{h}_i = \sum_{k \neq i} a_k \hat{h}_k \qquad (11)$$

where $\tilde{h}_i$ is the channel estimate at position i within a tile, $\hat{h}_k$ is a LSCE at position k within the same tile, for k=1 to $N_p$ but k≠i, and $a_k$ is a linear combination coefficient. For example, for the first pilot symbol, the Yule-Walker equations can be formed from the following equation:

$$\tilde{h}_1 = a_2 \hat{h}_2 + a_3 \hat{h}_3 + \ldots + a_{N_p} \hat{h}_{N_p} \qquad (12)$$

Using equation (12) and the correlation coefficients determined in equation (9), the Yule-Walker equations can be expressed in the form of a matrix (13):

$$\begin{bmatrix} 1 & R_{1,2} & R_{1,3} & \cdots & R_{1,N_p} \\ 0 & 1 & R_{2,3} & \cdots & R_{2,N_p} \\ 0 & R_{2,3}^* & 1 & \cdots & R_{3,N_p} \\ 0 & \cdots & \cdots & \cdots & \cdots \\ 0 & R_{2,N_p}^* & R_{3,N_p}^* & \cdots & 1 \end{bmatrix} \begin{bmatrix} \sigma_\epsilon^2 \\ a_2 \\ a_3 \\ \cdots \\ a_{N_p} \end{bmatrix} = \begin{bmatrix} 1 \\ R_{1,2}^* \\ R_{1,3}^* \\ \cdots \\ R_{1,N_p}^* \end{bmatrix} \qquad (13)$$

In step 445, the linear equations in the matrix (13) can be solved to determine the variance ($\sigma_\epsilon^2$) of linear estimation error and the linear combination coefficients ($a_2, a_3, \ldots, a_{N_p}$) associated with a channel estimate for the first pilot symbol. In addition, a scalar can be determined by:

$$S = 1 + |a_2|^2 + |a_3|^2 + \ldots + |a_{N_p}|^2 \qquad (14)$$

For PUSC mode, the linear channel estimate model is the same for all pilot symbols in a particular tile. Based on this symmetry, the values $\sigma_\epsilon^2, a_2, a_3, \ldots, a_{N_p}$ and S can be used for other pilot symbols in the same tile and also in other tiles. Accordingly, for a particular channel type, the Yule-Walker equations need only be solved once to generate linear combination coefficients and associated estimation error.

Referring to step 450, the channel estimate $\tilde{h}_i$ for the pilot symbol can be computed using equation (11). In addition, an intermediate value D can be determined by the following equations:

$$D_t = \frac{1}{N_p} \sum_{i=1}^{N_p} |r_i - p_i \tilde{h}_i|^2 \text{ and} \qquad (15)$$

$$D = \frac{1}{T} \sum_{t=1}^{T} D_t \qquad (16)$$

Proceeding to step 455, CINR can be reported by the following equation:

$$CINR = S \times \frac{RSSI}{D} - 1 + \frac{S \times \sigma_\epsilon^2}{D - \sigma_\epsilon^2} \times \frac{RSSI}{D} \qquad (17)$$

For an additive white Gaussian noise (AWGN) channel, it can be shown that the variance $\sigma_\epsilon^2$ associated with the channel linear estimation model (11) is equal to zero using a linear combination coefficient $1/(N_p-1)$ in the channel estimate. Accordingly, for an AWGN channel, equation (17) can be simplified to the following equation:

$$CINR = \left(1 + \frac{1}{N_p - 1}\right) \times \frac{RSSI}{D} - 1 \qquad (18)$$

Using equation (18), the correlation coefficients and Yule-Walker linear equations are not required to solve for the channel estimate. For example, in WiMax uplink PUSC mode, in which there are four pilot symbols, equation (18) can be reduced to:

$$CINR = \frac{4}{3} \times \frac{RSSI}{D} - 1 \qquad (19)$$

The arrangements described herein provide a method for estimating CINR and RSSI for a WiMax uplink channel based on the PUSC tile structure. Nonetheless, the arrangements can be implemented with other data population structures, such as those structures that may be used for signal uplink or downlink.

The present invention can be realized in hardware, software, or a combination of hardware and software. The present invention can be realized in a centralized fashion in one processing system or in a distributed fashion where different elements are spread across several interconnected processing systems. Any kind of processing system or other apparatus adapted for carrying out the methods described herein is suited. A typical combination of hardware and software can be a processing system with an application that, when being loaded and executed, controls the processing system such that it carries out the methods described herein. The present invention also can be embedded in an application product, which comprises all the features enabling the implementation of the methods described herein, and which when loaded in a processing system is able to carry out these methods.

The terms "computer program," "software," "application," variants and/or combinations thereof, in the present context, mean any expression, in any language, code or notation, of a set of instructions intended to cause a system having an information processing capability to perform a particular function either directly or after either or both of the following: a) conversion to another language, code or notation; b) reproduction in a different material form. For example, an application can include, but is not limited to, a subroutine, a function, a procedure, an object method, an object implementation, an executable application, an applet, a servlet, a source code, an object code, a shared library/dynamic load library and/or other sequence of instructions designed for execution on a processing system.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). This invention can be embodied in other forms without departing from the spirit or essential attributes thereof. Accordingly, reference should be made to the following claims, rather than to the foregoing specification, as indicating the scope of the invention.

What is claimed is:

1. A method for selecting at least one operating parameter of a communication system, comprising:
   determining a receive signal strength indicator (RSSI) for a communication signal;
   selecting a data set comprising a plurality of known datum;
   determining a least squares estimate (LSCE) for the data set by dividing each known datum's received value by its predetermined value;
   forming Yule-Walker equations based on, at least in part, correlation coefficients determined for the data set;
   solving the Yule-Walker equations by determining linear combination coefficients for at least one of the known datum to determine at least a variance of linear estimation error;
   determining an intermediate value for the communication signal based on, at least in part, a received value of at least one known datum contained in the communication signal, a predetermined value of the known datum and a channel estimate;
   estimating a carrier to interference and noise ratio (CINR) based on, at least in part, the RSSI and the intermediate value, a scalar determined from the linear combination coefficients and comprises solving the equation $$CINR = S \times \frac{RSSI}{D} - 1 + \frac{S \times \sigma_\varepsilon^2}{D - \sigma_\varepsilon^2} \times \frac{RSSI}{D}$$

where S is the determined scalar, D is the intermediate value and $\sigma_\varepsilon^2$ is the variance; and
   selecting the operating parameter based on, at least in part, the estimated CINR.

2. The method of claim 1, wherein determining the RSSI comprises:
   determining an individual RSSI value for each of a plurality of tiles; and
   averaging the individual RSSI values.

3. The method of claim 1, wherein determining RSSI for the communication signal comprises determining a receive power of the known data.

4. The method of claim 1, wherein selecting the operating parameter comprises selecting at least one operating parameter selected from the group consisting of a modulation code scheme and a tone/subchannel assignment.

5. The method of claim 1, wherein determining the intermediate value for the communication signal is based on, at least in part, a received value of at least one known datum selected from the group consisting of a pilot symbol, a preamble, a mid-amble, and a symbol generated with decoder feedback.

6. A machine readable storage, having stored thereon a computer program having a plurality of code sections comprising:
   code for determining a receive signal strength indicator (RSSI) for a communication signal;
   code for selecting a data set comprising a plurality of known datum;
   code for determining a least squares estimate (LSCE) for the data set by dividing each known datum's received value by its predetermined value;
   code for forming Yule-Walker equations based on, at least in part, correlation coefficients determined for the data set;
   code for solving the Yule-Walker equations by determining linear combination coefficients for at least one of the known datum to determine at least a variance of linear estimation error;
   code for determining an intermediate value for the communication signal based on, at least in part, a received value of at least one known datum contained in the communication signal, a predetermined value of the known datum and a channel estimate;
   code for estimating a carrier to interference and noise ratio (CINR) based on, at least in part, the RSSI and the intermediate value, a scalar determined from the linear combination coefficients and comprises solving the equation $$CINR = S \times \frac{RSSI}{D} - 1 + \frac{S \times \sigma_\varepsilon^2}{D - \sigma_\varepsilon^2} \times \frac{RSSI}{D}$$

where S is the determined scalar D is the intermediate value and $\sigma_\epsilon^2$ is the variance; and code for selecting the operating parameter based on, at least in part, the estimated CINR.

7. The machine readable storage of claim 6, wherein the code for determining the RSSI comprises:

code for determining an individual RSSI value for each of a plurality of tiles; and code for averaging the individual RSSI values.

8. The machine readable storage of claim 6, wherein the code for selecting the operating parameter comprises code for selecting at least one operating parameter selected from the group consisting of a modulation code scheme and a tone/subchannel assignment.

9. A method for selecting at least one operating parameter of a communication system, comprising:

determining a receive signal strength indicator (RSSI) for a communication signal;

determining an intermediate value for the communication signal based on, at least in part, a received value of at least one known datum contained in the communication signal, a predetermined value of the known datum and a channel estimate; estimating a carrier to interference and noise ratio (CINR) based on, at least in part, the RSSI and the intermediate value and comprises solving the equation:

$$CINR = \left(1 + \frac{1}{N_p - 1}\right) \times \frac{RSSI}{D} - 1$$

where D is the intermediate value and $N_p$ is a number of known datum from which the intermediate value is determined; and selecting the operating parameter based on, at least in part, the estimated CINR.

\* \* \* \* \*